(12) United States Patent
Filho et al.

(10) Patent No.: US 12,521,800 B2
(45) Date of Patent: Jan. 13, 2026

(54) HYDRAULIC CHUCK ASSEMBLY AND EXPANSION SLEEVE THEREFOR

(71) Applicant: Kennametal Inc., Latrobe, PA (US)

(72) Inventors: Ruy Frota De Souza Filho, Latrobe, PA (US); Austin Baer, Irwin, PA (US); Dominik Schmid, Fürth (DE)

(73) Assignee: KENNAMETAL INC., Latrobe, PA (US)

(*) Notice: Subject to any disclaimer, the term of this patent is extended or adjusted under 35 U.S.C. 154(b) by 224 days.

(21) Appl. No.: 18/228,430

(22) Filed: Jul. 31, 2023

(65) Prior Publication Data

US 2025/0041949 A1  Feb. 6, 2025

(51) Int. Cl.
  *B23B 31/30* (2006.01)
(52) U.S. Cl.
  CPC .................. *B23B 31/305* (2013.01)
(58) Field of Classification Search
  CPC ......... B23B 31/10; B23B 31/40; B23B 31/30; B23B 31/302; B23B 31/305
  See application file for complete search history.

(56) References Cited

U.S. PATENT DOCUMENTS

| | | | |
|---|---|---|---|
| 2,392,039 A | 1/1946 | Gideon | |
| 3,516,681 A * | 6/1970 | Cox | B23B 31/305 279/4.03 |
| 3,731,942 A | 5/1973 | Buck | |
| 3,830,509 A * | 8/1974 | Weber | B23B 31/305 242/571.1 |
| 5,030,048 A | 7/1991 | Massa | |
| 5,050,048 A | 9/1991 | Hendrischk et al. | |
| 5,769,487 A | 6/1998 | Michler et al. | |
| 5,957,443 A * | 9/1999 | Mascola | B23Q 3/108 269/22 |

(Continued)

FOREIGN PATENT DOCUMENTS

| | | |
|---|---|---|
| DE | 29603751 U1 | 8/1996 |
| DE | 19852444 A1 | 5/1999 |

(Continued)

OTHER PUBLICATIONS

Oct. 18, 2024 Foreign Office Action German Application No. DE202310206827, 14 pages.

(Continued)

*Primary Examiner* — Nicole N Ramos
(74) *Attorney, Agent, or Firm* — Christopher J. Owens

(57) ABSTRACT

A hydraulic chuck assembly includes a tool support member having an axial bore. An expansion sleeve is received within the axial bore of the tool support member. The expansion sleeve comprises an inner surface, an outer surface and a front flange extending radially outward from the outer surface. A primary pressure chamber is formed between the axial bore of the tool support member and the outer surface of the expansion sleeve. A flexibility of the expansion sleeve is increased by removing material from the expansion sleeve in a vicinity of a front braze ring and a rear braze ring, thereby decreasing a maximum stress in the front braze ring and the rear braze ring. The material is removed by undercuts that form secondary pressure chambers in fluid communication with the primary pressure chamber.

12 Claims, 8 Drawing Sheets

(56) References Cited

U.S. PATENT DOCUMENTS

| | | |
|---|---|---|
| 7,914,010 B2 | 3/2011 | Herud |
| 9,676,037 B2 * | 6/2017 | Herud .................. B23B 31/028 |
| 10,293,413 B2 * | 5/2019 | Schuffenhauer ...... B23B 31/028 |
| 2004/0191022 A1 * | 9/2004 | Broghammer .... B23B 29/03457 |
| | | 409/234 |
| 2007/0145692 A1 | 6/2007 | Herud |

FOREIGN PATENT DOCUMENTS

| | | | |
|---|---|---|---|
| DE | 102009049582 B3 | 5/2011 | |
| DE | 102014208140 A1 | 11/2015 | |
| DE | 102019124519 A1 * | 3/2021 | ........... B23B 31/305 |
| WO | 0160556 A1 | 8/2001 | |
| WO | WO-2014107774 A1 * | 7/2014 | ............. B23B 31/02 |
| WO | 2021105436 A1 | 6/2021 | |

OTHER PUBLICATIONS

Jun. 4, 2025 Foreign Office Action Chinese Application No. CN202310885727.1, 02 Pages.

* cited by examiner

HYDRAULIC CHUCK ASSEMBLY AND EXPANSION SLEEVE THEREFOR

FIELD OF THE DISCLOSURE

The invention pertains to a hydraulic chuck assembly and an expansion sleeve for a hydraulic chuck assembly.

BACKGROUND OF THE DISCLOSURE

Chucks are designed to securely hold objects, such as tool shanks. A hydraulic chuck comprises a center cylindrical bore designed to clamp a tool shank. A cylindrical sleeve designed to hold tool shanks is received in the center cylindrical bore and soldered in place. The sleeve comprises a pressure chamber comprising a hydraulic fluid, such as oil. A pressurized member, such as a screw, communications with the oil to pressurize the oil when the screw is advanced. When the oil is pressurized, the sleeve clamps a tool shank. Over time, the oil pressure creates cracks in the soldering, and the oil from the pressure chamber leaks out causing catastrophic failure of tools.

SUMMARY OF THE DISCLOSURE

The problem of reducing brazing cracks in a hydraulic chuck assembly is solved by increasing the flexibility of the expansion sleeve in the vicinity of one or both of the front and rear braze rings. In one embodiment, the flexibility of the expansion sleeve is increased by removing material from the expansion sleeve in the vicinity of one or both of the front and rear braze rings.

In one aspect of the disclosure, a hydraulic chuck assembly comprises a tool support member having an axial bore. An expansion sleeve is received within the axial bore of the tool support member. The expansion sleeve comprises an inner surface, an outer surface, a front flange extending radially outward from the outer surface and a rear flange extending radially outward from the outer surface. A primary pressure chamber is formed between the axial bore of the tool support member and the outer surface of the expansion sleeve, wherein a flexibility of the expansion sleeve is increased by removing material from the expansion sleeve in a vicinity of one of a front braze ring and a rear braze ring, thereby decreasing a maximum stress in one of the front braze ring and the rear braze.

In another aspect of the disclosure, a hydraulic chuck assembly, comprises a tool support member having an axial bore, and an expansion sleeve received within the axial bore of the tool support member. The expansion sleeve comprises an inner surface, an outer surface, a front flange extending radially outward from the outer surface and a rear flange extending radially outward from the outer surface. A primary pressure chamber is formed between the axial bore of the tool support member and the outer surface of the expansion sleeve, wherein a flexibility of the expansion sleeve is increased by removing material from the flange of the expansion sleeve in a vicinity of a front braze ring and removing material from the expansion sleeve in a vicinity of a rear braze ring, thereby decreasing a maximum stress in the front braze ring and the rear braze ring.

In yet another aspect of the disclosure, an expansion sleeve for a hydraulic chuck assembly comprises an inner surface; an outer surface having a first reduced diameter section, a second reduced diameter section and a relatively larger diameter intermediate section therebetween; a front flange extending radially outward from the outer surface, and a rear flange extending radially outward from the outer surface, wherein a flexibility of the expansion sleeve is increased by removing material from the expansion sleeve in a vicinity of one of a front braze ring and a rear braze ring, thereby decreasing a maximum stress in one of the front braze ring and the rear braze ring.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION

Figure 1:
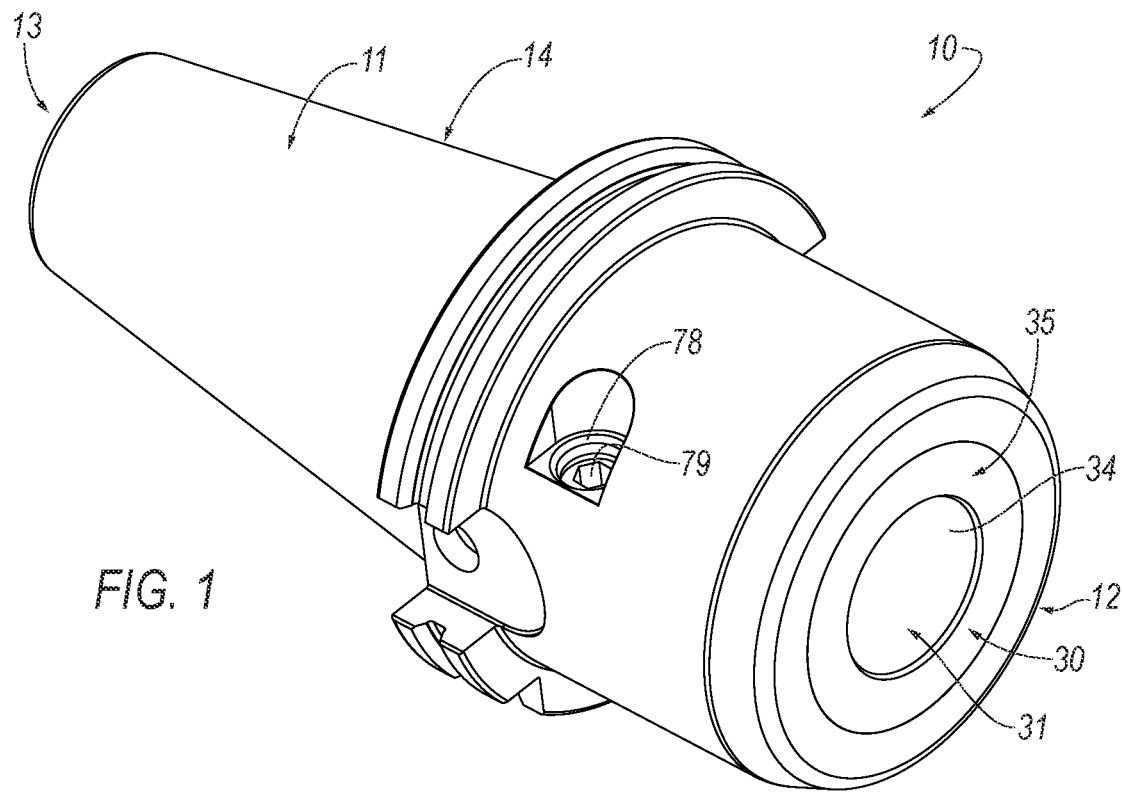
FIG. 1 is a front isometric view of a hydraulic chuck assembly in accordance with an embodiment of the disclosure.
Figure 2:
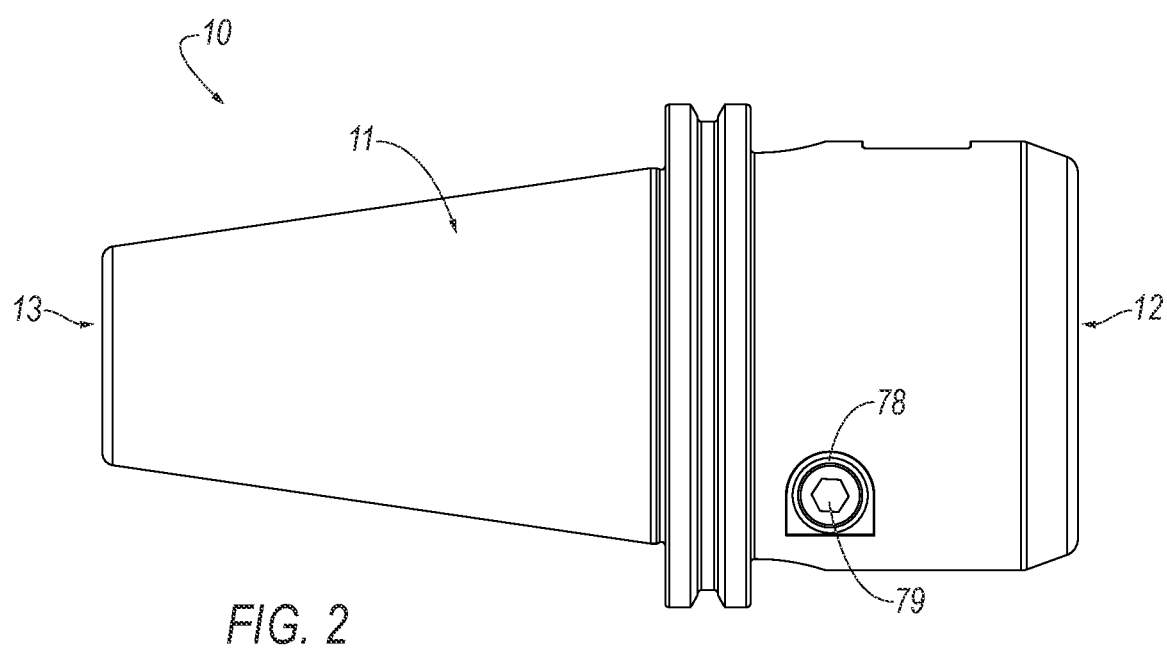
FIG. 2 is a side elevational view of the hydraulic chuck assembly of FIG. 1.
Figure 3:
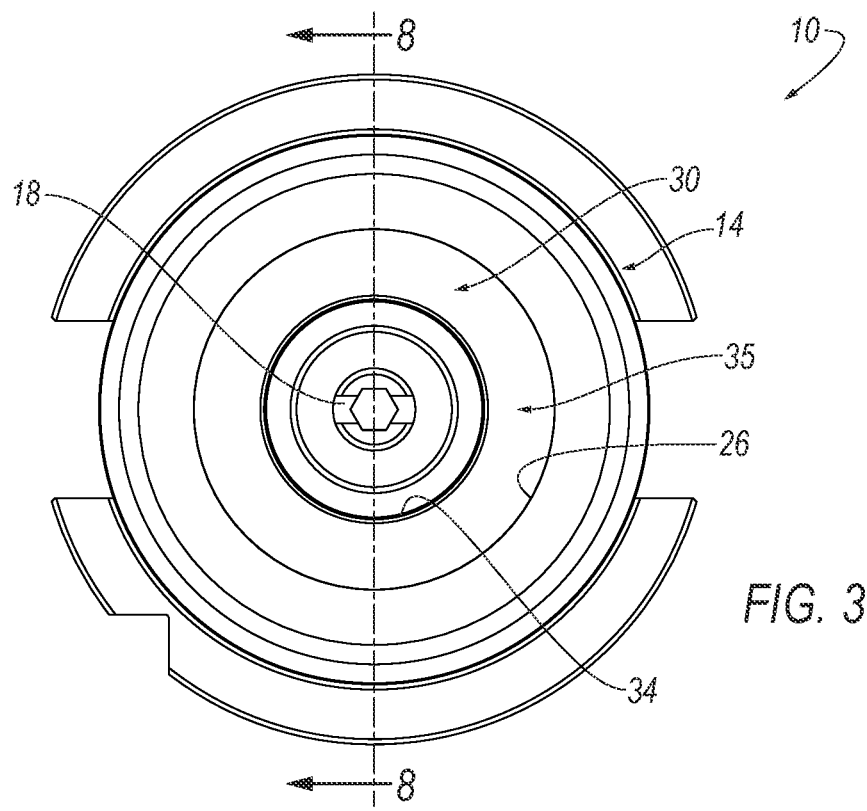
FIG. 3 is a top view of a hydraulic chuck assembly comprising a tool support member and the expansion sleeve of FIG. 1.
Figure 9:
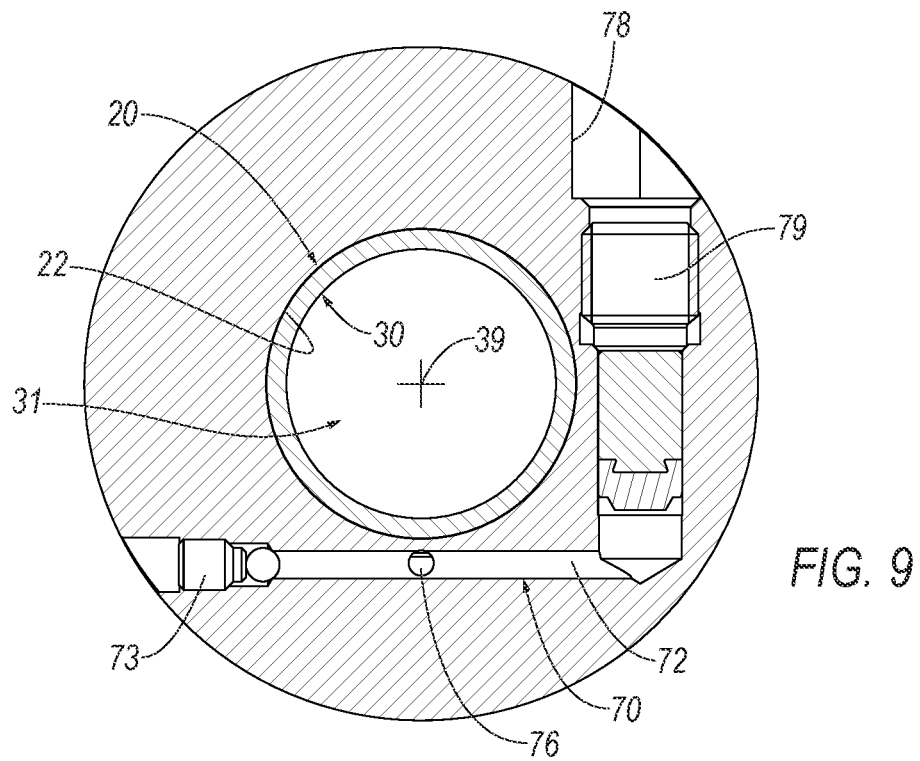
FIG. 9 is a cross-sectional view of the hydraulic chuck assembly taken along line 9-9 of FIG. 8.
Figure 4:
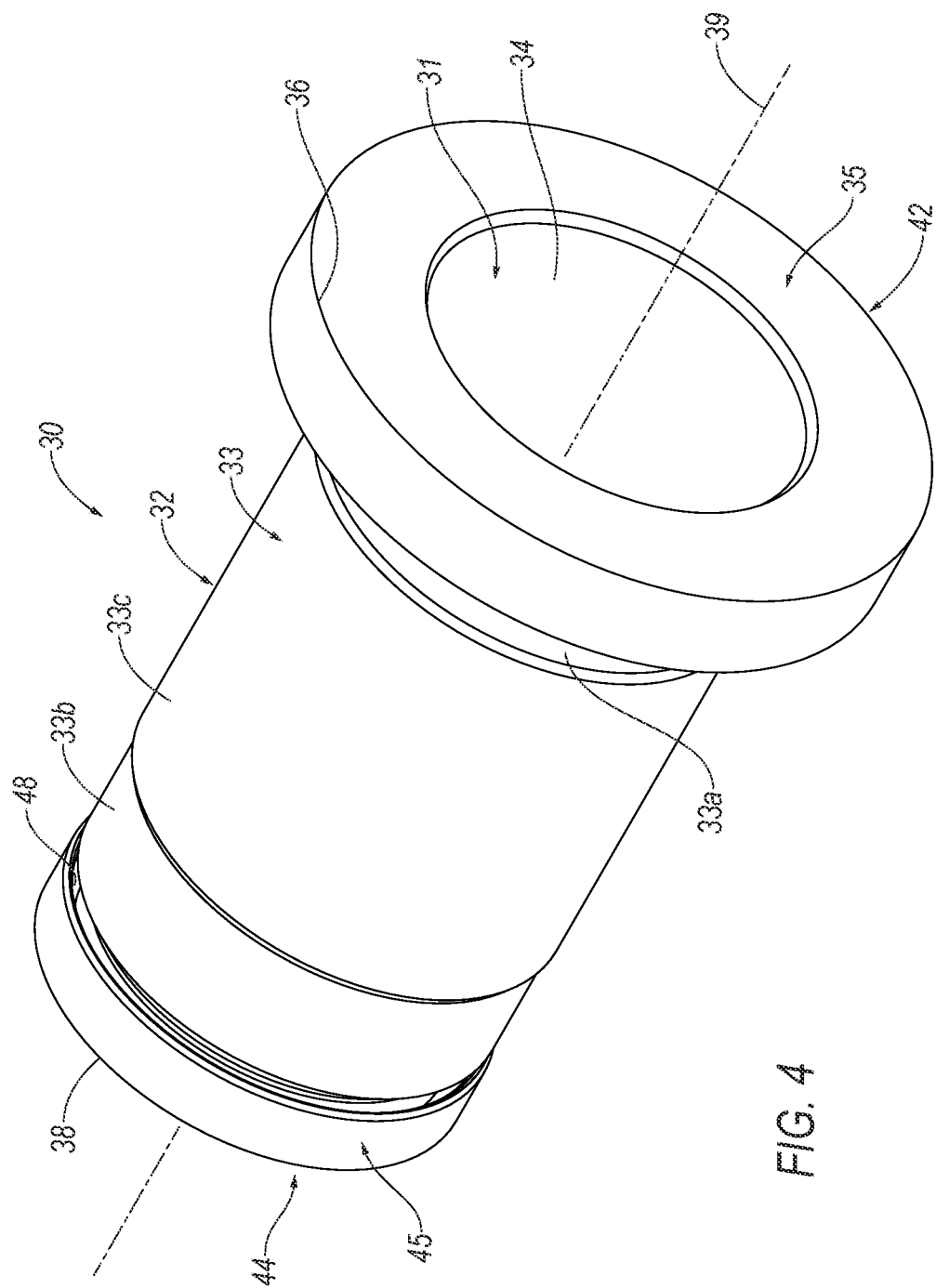
FIG. 4 is a front isometric view of an expansion sleeve in accordance with an embodiment of the disclosure.
Figure 5:
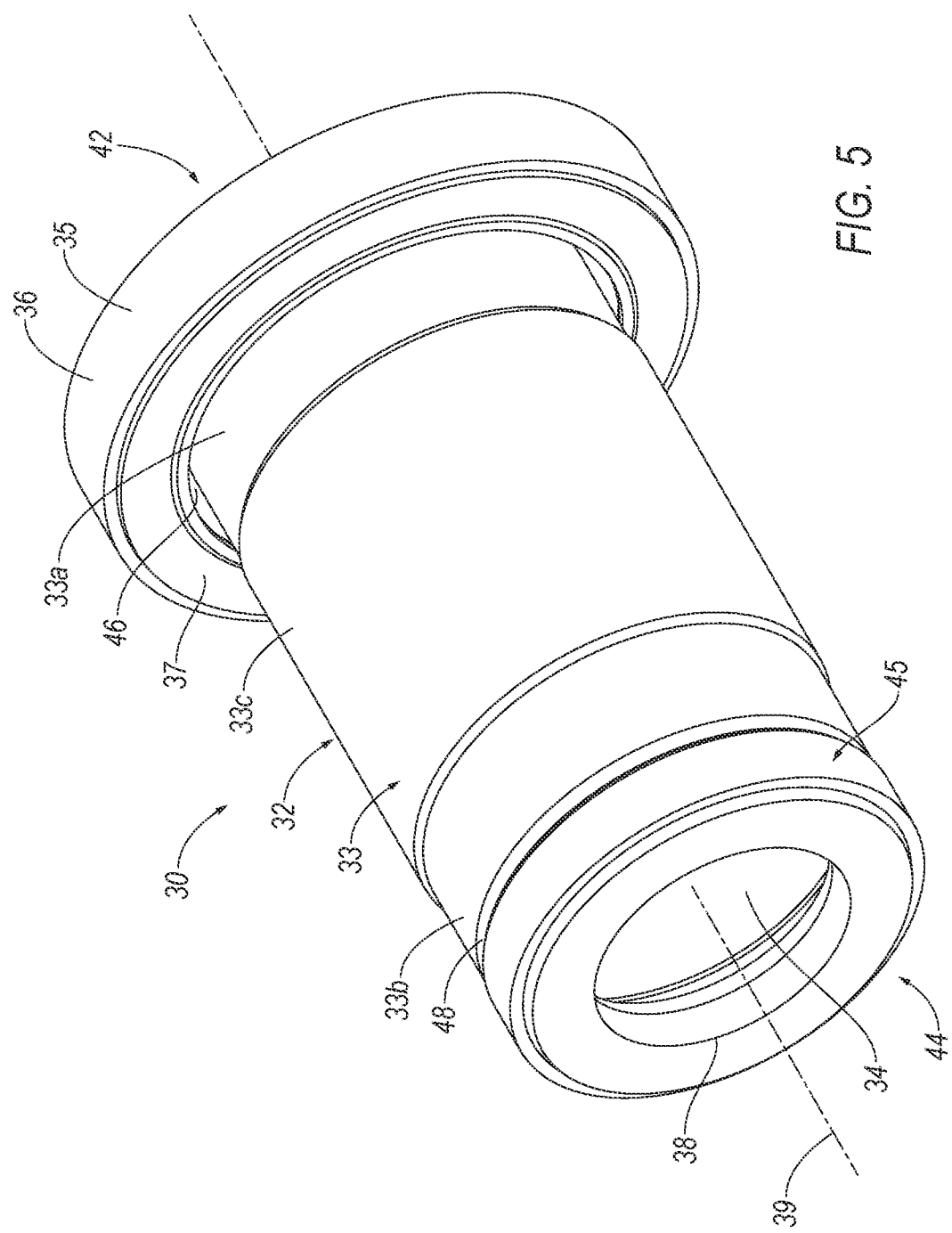
FIG. 5 is a rear isometric view of the expansion sleeve of FIG. 4.
Figure 6:
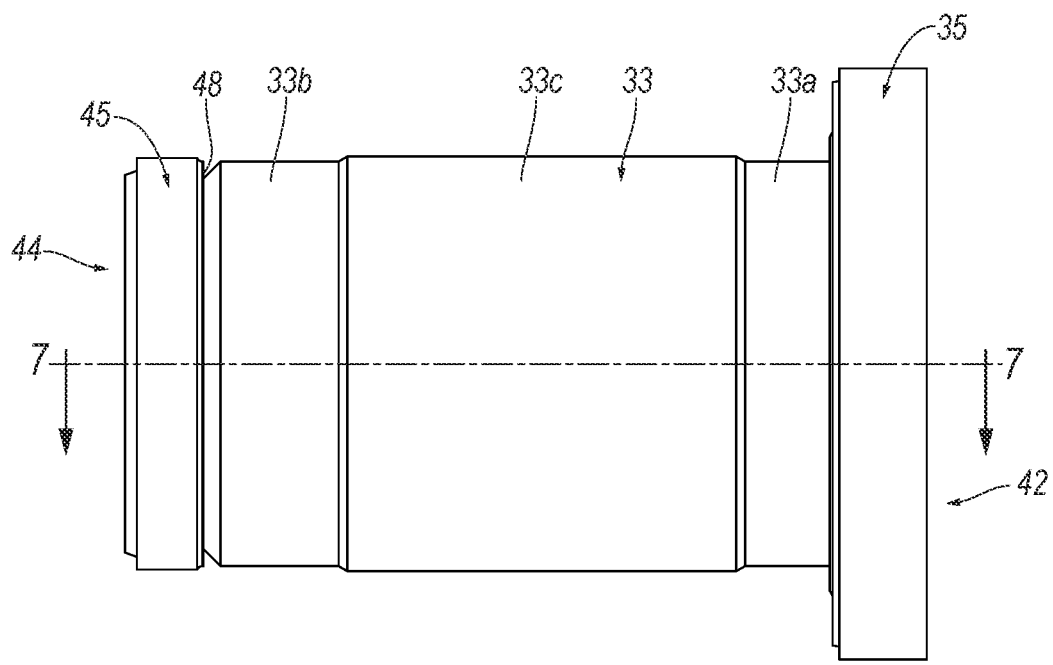
FIG. 6 is a side elevational view of the expansion sleeve of FIG. 4.
Figure 7:
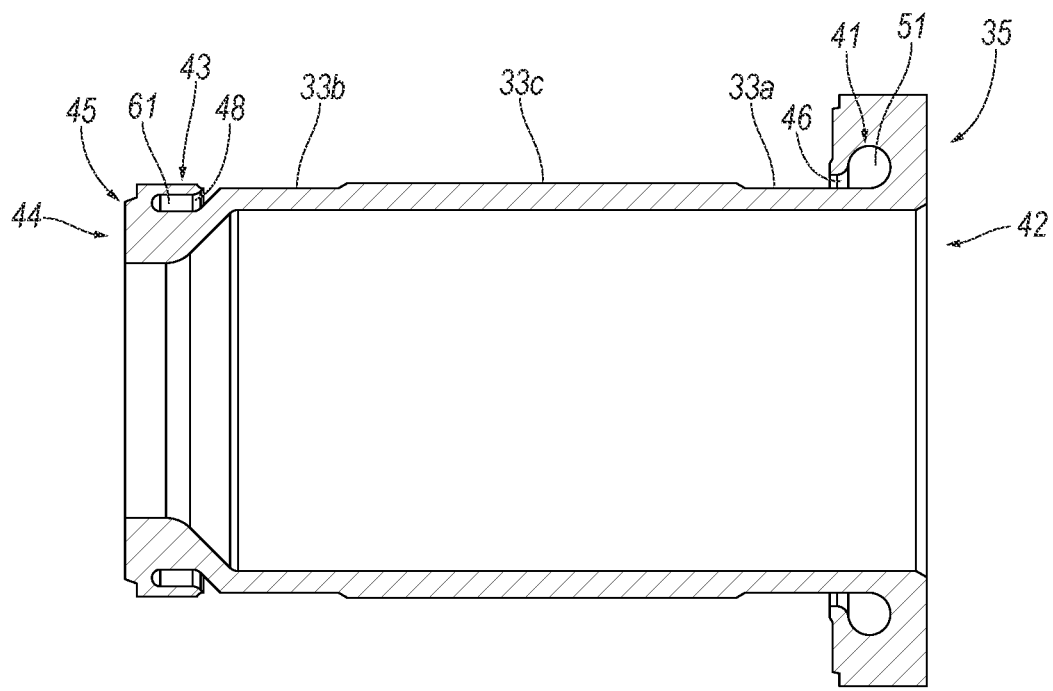
FIG. 7 is a cross-sectional view of the expansion sleeve taken along line 7-7 of FIG. 6.

Referring now to FIGS. 1-3, a hydraulic chuck assembly 10 is shown according to an embodiment of the disclosure.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this disclosure pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by embodiments. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "overlap" is defined as to extend over or past and cover a part of. For example, the roof shingle overlap each other.

As used herein, the term "braze" is defined as to form, fix or joining by soldering with an alloy of copper and zinc at high temperature.

Referring now to FIGS. 1-3 and 8, the hydraulic chuck assembly 10 comprises a tool support member 11 having a tool receptacle front end 12 and a machine-tool rear end 13. The hydraulic chuck assembly 10 has a body 14 extending radially between the tool receptacle front end 12 and the machine-tool rear end 13. The hydraulic chuck assembly 10 is secured to a machine tool by means of a threaded central bolt 18.

An axial bore 20 located at the tool receptacle front end 12 is configured to receive an expansion sleeve 30. The axial bore 20 has a generally cylindrical inner surface 22 that has a slightly larger diameter than the expansion sleeve 30, as described in more detail below. The axial bore 20 has a bottom 29 located toward the machine-tool rear end 13. The axial bore 20 transitions to an annular front recess 24 toward the tool receptacle front end 13 of the hydraulic chuck assembly 10. The annular front recess 24 has an inner radial surface 26 and a front face 28.

Referring now to FIGS. 4-7, an expansion sleeve 30 is shown according to an embodiment of the disclosure. The expansion sleeve 30 includes a generally cylindrical body 32 having an axial forward end 42 and an axial rearward end 44 along a longitudinal axis 39 of the expansion sleeve 30. A tool holder receptacle opening 31 is provided at the forward end 42. The body 32 includes a radial outer wall 33 and a clamping inner wall 34 extend between the axial forward end 42 and the axial rearward end 44. The clamping inner surface of the inner wall 34 extends to the tool holder receptacle opening 31 at the forward end 42 of the expansion sleeve 30. The expansion sleeve 30 includes a front flange 35 adjacent the axial forward end 42 and a rear flange 45 adjacent the axial rearward end 44 thereof. The front flange 35 has a radial outer edge 36 and a rear face 37. The sleeve 30 has a rear edge 38 adjacent the axial rearward end 44.

The radial outer wall 33 has a first reduced diameter section 33a proximate the forward end 42, a second reduced diameter section 33b proximate the axial rearward end 44 and a relatively larger diameter intermediate section 33c therebetween.

Referring now to FIGS. 8-11, a primary pressure chamber 50 is formed between the cylindrical inner surface 22 of the axial bore 20 and the radial outer surface 33 of the expansion sleeve 30. Specifically, the primary pressure chamber 50 is formed between the cylindrical inner surface 22 of the axial bore 20 and the first reduced diameter section 33a, the second diameter section 33b and the relatively larger diameter intermediate section 33c of the radial outer surface 33 of the expansion sleeve 30. The primary pressure chamber 50 extends substantially parallel with the longitudinal axis 39 of the expansion sleeve 30.

Figure 8:
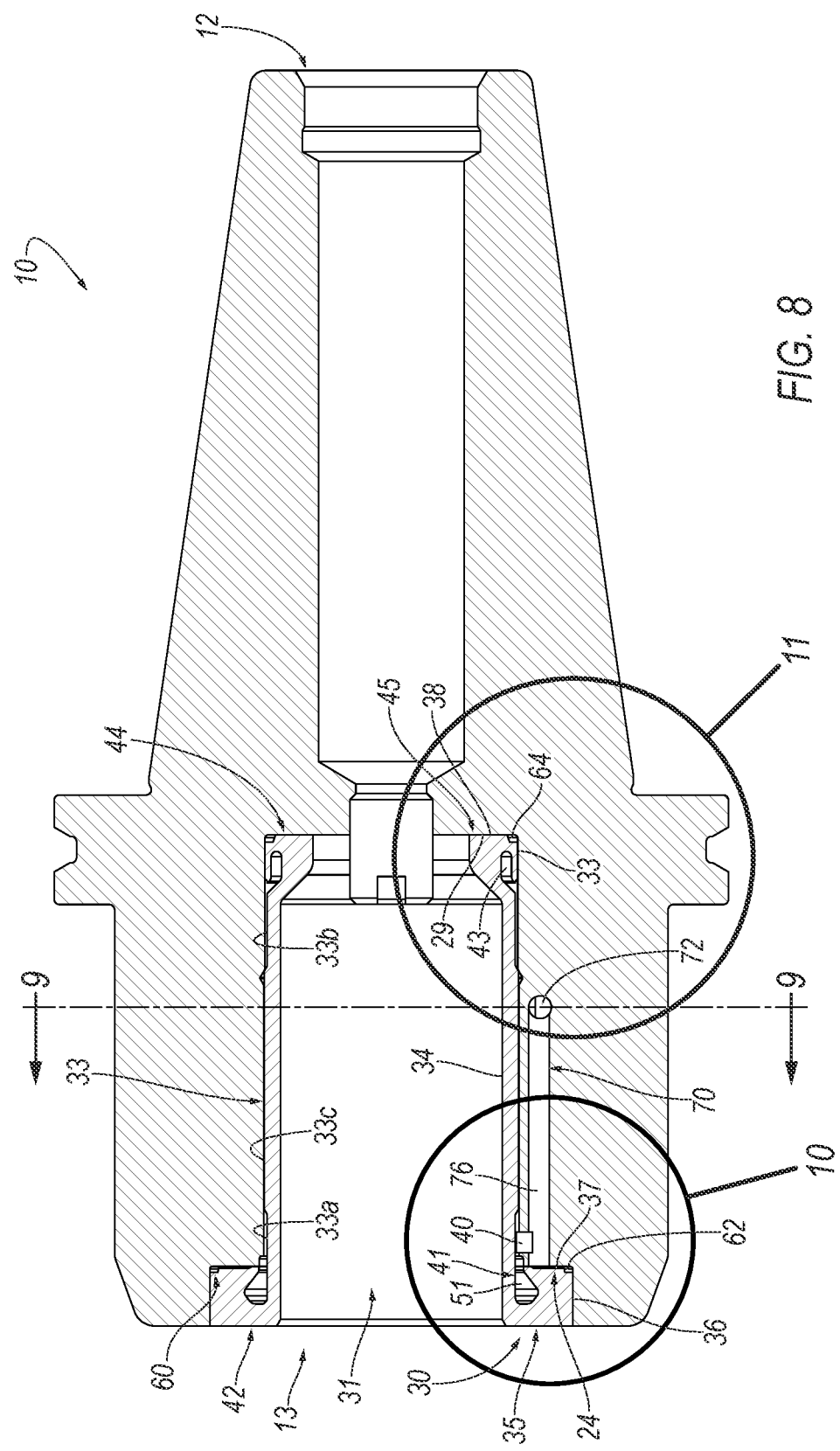
FIG. 8 is a cross-sectional view of the hydraulic chuck assembly taken along line 8-8 of FIG. 3.

As shown in FIG. 8, the relatively thinner first and second reduced diameter sections 33a, 33b of the radial outer surface 33 of the expansion sleeve 30 are able to deform to a greater extent than the relatively thicker intermediate section 33c when the internal pressure chamber 50 is pressurized by hydraulic fluid. This causes the intermediate section 33c to flex inwardly and provide increased clamping force on a tool shank in the midsection region. The intermediate section 33c can be relatively long because the integrally formed outer and inner walls 33 and 34 are made of a single unitary piece of material and no braze or other type of joint is required in communication with or adjacent to the pressure chamber 50. The lengths of the first and second reduced diameter sections 33a, 33b may be minimized so that the majority of the length of the pressure chamber 50 at the relatively larger diameter intermediate section 33c provides clamping force on the tool shank, thus improving clamp stability.

Figure 10:
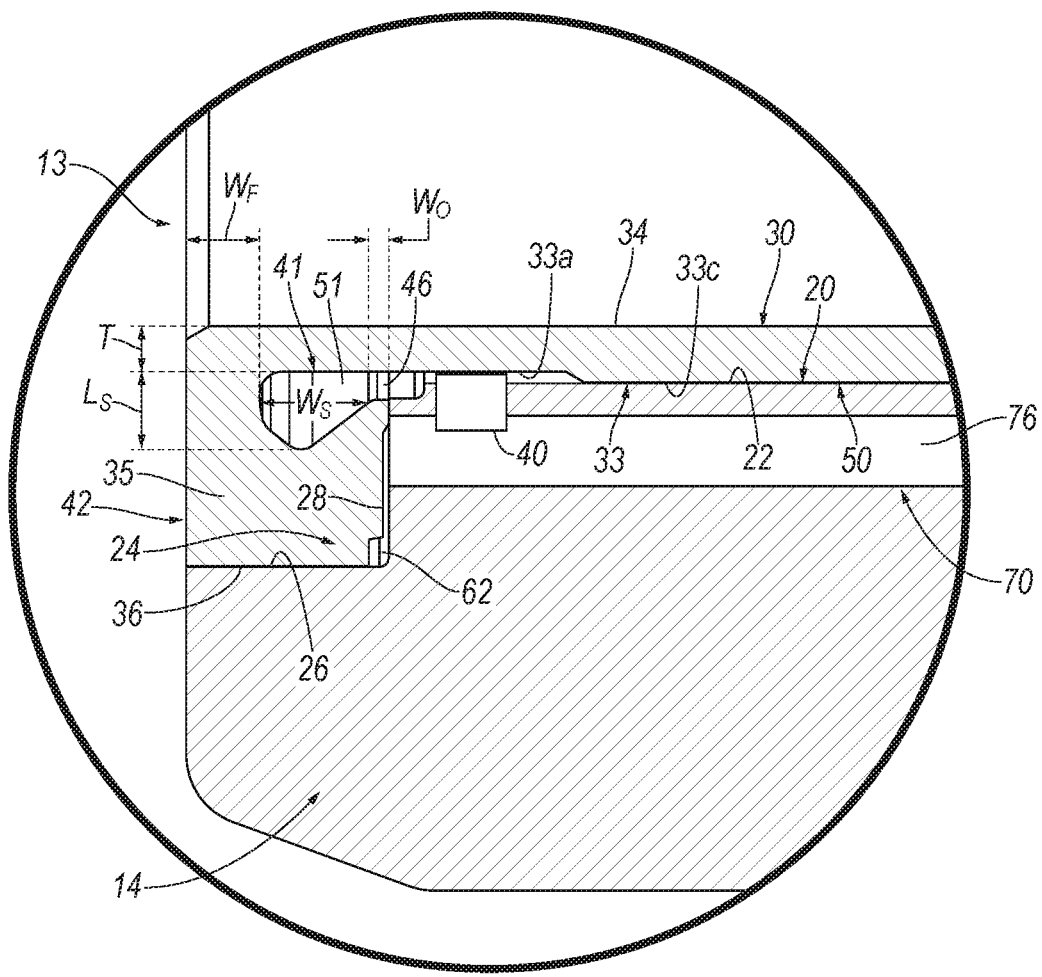
FIG. 10 is an enlarged view of the front portion of the expansion sleeve of FIG. 8 showing an undercut in the flange to increase flexibility of the expansion sleeve in the region of the front braze ring.
Figure 11:
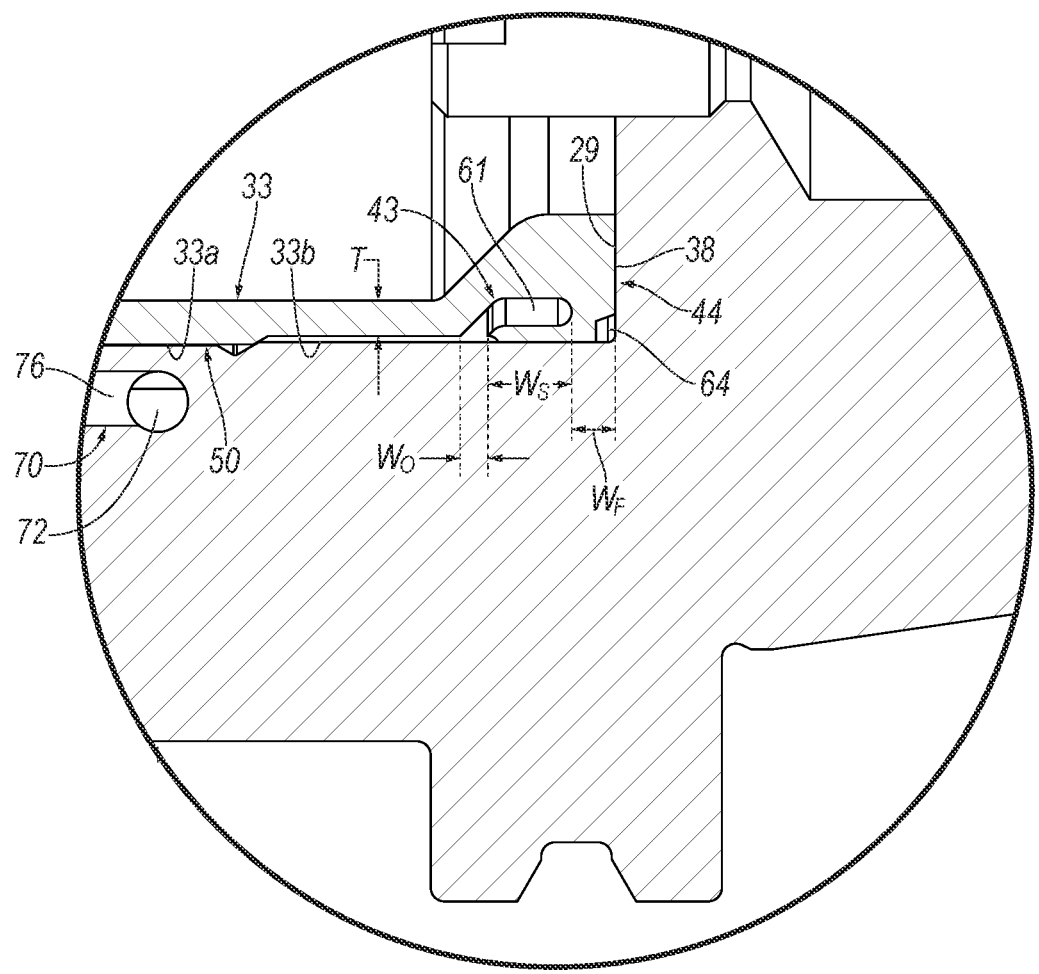
FIG. 11 is an enlarged view of the rear portion of the expansion sleeve of FIG. 8 showing an undercut in the flange to increase flexibility of the expansion sleeve in the region of the front braze ring.

As shown in FIGS. 8, 10 and 11, the expansion sleeve 30 is fastened to the tool support member 11 by a sleeve connection 60 including a front braze ring 62 and a rear braze ring 64. The front braze ring 62 is located at the radial outer edge 36 and at the rear face 37 of the front flange 35. The front braze ring 62 is also located in the annular front recess 24 of the body 14, and more specifically at the intersection of the inner radial surface 26 and front face 28 of the annular front recess 24. The rear braze ring 64 is located at the rear edge 38 of the expansion sleeve 30 adjacent to the radial outer surface 33. The rear braze ring 64 is also located at the bottom 29 of the axial bore 20 adjacent to the inner surface 22 of the axial bore 20.

Referring now to FIGS. 5, 7, 10 and 11, one aspect of the disclosure is that the expansion sleeve 30 includes features that increase the flexibility of the expansion sleeve 30 in desired regions of the expansion sleeve 30. In one embodiment, the flexibility of the expansion sleeve 30 is achieved by removing material from the expansion sleeve 30.

For example, the flexibility of the expansion sleeve 30 is increased in the region of the front braze ring 62 by forming a front undercut 41 in the front flange 35 of the expansion sleeve 30. As shown in FIG. 10, a fluid opening 46 in the form of a gap is formed between the first reduced diameter section 33a and the front flange 35. The fluid opening 46 is in fluid communication with the primary pressure chamber 50 to provide pressurized fluid to the front undercut 41, thereby forming a front secondary pressure chamber 51 that extends radially outward from the primary pressure chamber 50 into the front flange 35. In one embodiment, the fluid opening 46 has a width, $W_O$, of at least 0.7 mm.

The front secondary pressure chamber 51 may extend radially outward in a direction perpendicular to the primary pressure chamber 50, or in a non-perpendicular direction. During fabrication of the expansion sleeve 30, the front secondary pressure chamber 51 may be formed at the same time the primary pressure chamber 50 is formed during the formation of the expansion sleeve 30, for example, by additive manufacturing. The length, $L_S$, of the front secondary pressure chamber 51 and the width, $W_S$, of the front secondary pressure chamber 51 are shown. The ratio of $L_S$:T may typically be from 2:1 to 10:1, where T is the thickness of the first reduced diameter section 33a of the expansion sleeve 30. In one embodiment, for example, the ratio of $W_S$:T may typically be from 1:1 to 10:1. In another embodiment, the ratio of $(W_S+W_O)$:T may be from 1:1 to 10:1. In some embodiments, the width, $W_O$, may be zero and the width, $W_S$ is equal to the total width of the secondary pressure chamber 51 (i.e., the width, $W_S$ and the width, $W_O$). The ratio of $W_F$:T may typically be from 1:1 to 1.5:1, where $W_F$ is the width between the front second pressure chamber 51 and the axial forward end 42.

Similar to the front braze ring 62, the flexibility of the expansion sleeve 30 is also increased by removing material from the expansion sleeve 30 in the region of the rear braze ring 64. As shown in FIG. 11, a rear undercut 43 is provided in proximity to the rearward end 44 in the region of the rear braze ring 64. A fluid opening 48 in the form of a slot formed in the second reduced diameter section 33b proximate the rearward end 44 is in fluid communication with the rear pressure chamber 50. The fluid opening 48 is in fluid communication with the primary pressure chamber 50 to provide pressurized fluid to the rear undercut 43, thereby forming a rear secondary pressure chamber 61 that extends radially outward from the primary pressure chamber 50 into the rear flange 45. In one embodiment, the fluid opening 48 has a width, $W_O$, of at least 0.7 mm.

The rear secondary pressure chamber 61 may extend radially outward in a direction perpendicular to the primary pressure chamber 50, or in a non-perpendicular direction. During fabrication of the expansion sleeve 30, the rear secondary pressure chamber 61 may be formed at the same time the primary pressure chamber 50 is formed during the formation of the expansion sleeve 30, for example, by additive manufacturing. The length, $L_S$, of the rear secondary pressure chamber 51 and the width, $W_S$, of the rear secondary pressure chamber 51 are shown. The ratio of $L_S$:T may typically be from 2:1 to 10:1, where T is the thickness of the second reduced diameter section 33b of the expansion sleeve 30. The ratio of $W_F$:T may typically be from 1:1 to 1.5:1, where $W_F$ is the width between the rear second pressure chamber 51 and the axial rearward end 44.

As mentioned above, the front and rear undercuts 41, 43 increase the flexibility of the expansion sleeve 30 in the region of one or both of the front and rear braze rings 62, 64 and the front and rear secondary pressure chambers 51, 61 allow for pressurized fluid to be provided in a location that will put these regions in compression to minimize the tensile stress in the front and rear braze rings 62, 64. It will be appreciated that the invention is not limited by removing material from the expansion sleeve 30 in form of the undercuts 41, 43, and that the flexibility of the expansion sleeve 30 can be increased by removing material using other shapes and sizes, so long as the flexibility of the expansion sleeve 30 is increased in the region of one or both of the front and rear braze rings 62, 64.

Finite Element Analysis (FEA) simulations were studied with and without a cutting tool secured within the expansion sleeve 30. FEA analysis without the cutting tool indicates a decrease in the maximum stress in the front and rear braze rings 62, 64 of about 91% and a decrease in the maximum stress in the expansion sleeve 30 of about 46%. FEA analysis with the cutting tool secured within the expansion sleeve 30 indicates a decrease in the maximum stress in the front and rear braze rings 62, 64 of about 85%, a decrease in the maximum stress in the expansion sleeve 30 of about 26% and an increase in the grip force reaction of about 29%.

As shown in FIGS. 8-11, the hydraulic chuck assembly 10 includes a pressurized fluid system 70 that supplies hydraulic fluid to a pressure chamber 50 between formed the inner surface 22 of the axial bore 20 and the expansion sleeve 30. Hydraulic fluid may be introduced to the pressurized fluid system 70 through a pressurized fluid fill port 73 into the pressurize fluid supply inlet 72. The hydraulic fluid travels from the pressurized fluid supply inlet 72 to a pressurized fluid line 76. The pressurized fluid line 76 is in fluid communication with an inlet 40 of the expansion sleeve 30, through which hydraulic fluid is introduced into the pressure chamber 50 formed between the expansion sleeve 30 and the inner surface 22 of the axial bore 20. The pressurized fluid supply inlet 72 may be sealed in any manner known in the art, including but not limited to, an expansion plug or press ball 73, and the like.

A pressure adjustment bore 78 is in communication with the pressurized fluid system 70. A pressure adjustment screw 79 is inserted into the pressure adjustment bore 78. The pressure adjustment screw 79 regulates the pressure in the pressure chamber. When the screw is tightened, high pressure builds up in the pressure chamber 50. As a result of this pressure, the expansion sleeve 30 is actuated inward elastically in a radial direction for chucking a tool.

The expansion sleeve 30 is releasably attached to the tool support member 11 so as to secure the expansion sleeve 30 to the tool support member 11 for operation of the hydraulic chuck assembly 10 while allowing for removal of the expansion sleeve 30 for replacement or repair as may be desired. Various means of attaching the expansion sleeve 30 to the tool support member 11 are discussed herein. In an embodiment of the present invention, the expansion sleeve 30 is attached to the tool support member 11 by way of brazing at the front braze ring 62 and the rear braze ring 64. The brazing is located away from the pressure chamber 50 so that direct pressure is not placed upon the brazing joints, providing a more wear-resistant expansion sleeve 30.

In some embodiments, the expansion sleeve 30 may be made of a harder material than the tool support member 11, such as carbide steel. The tool support member 11 may typically be made of, for example, steel or suitable like materials. The harder material of the expansion sleeve 30 may provide increased stiffness and hardness, thus making the system more wear resistant. In other embodiments, the expansion sleeve 30 may be made of a material having low thermal conductivity, such as stainless steel or ceramic. This provides for a sleeve with lower thermal conductivity, which may prevent unwanted heating of the hydraulic fluid in the pressurized fluid system 70.

The patents and publications referred to herein are hereby incorporated by reference.

Having described presently preferred embodiments the invention may be otherwise embodied within the scope of the appended claims.

What is claimed is:

1. A hydraulic chuck assembly, comprising:
   a tool support member having an axial bore; and
   an expansion sleeve received within the axial bore of the tool support member, the expansion sleeve comprising an inner surface, an outer surface, a front flange extending radially outward from the outer surface and a rear flange extending radially outward from the outer surface;
   a primary pressure chamber formed between the axial bore of the tool support member and the outer surface of the expansion sleeve;
   a front secondary pressure chamber within the front flange in a vicinity of a front braze ring and in fluid communication with the primary pressure chamber; and
   a rear secondary pressure chamber within the rear flange in a vicinity of a rear braze ring and in fluid communication with the primary pressure chamber;
   wherein pressurized fluid within the primary pressure chamber, front secondary pressure chamber and the rear secondary pressure chamber put the front and rear braze rings in compression to decrease the maximum stress in the front and rear braze rings.

2. The hydraulic chuck assembly of claim 1, wherein the front flange of the expansion sleeve includes a front undercut in the front flange.

3. The hydraulic chuck assembly of claim 2, wherein the front undercut forms the front secondary pressure chamber in fluid communication with the primary pressure chamber.

4. The hydraulic chuck assembly of claim 1, wherein the rear flange of the expansion sleeve includes a rear undercut in the rear flange.

5. The hydraulic chuck assembly of claim 4, wherein the rear undercut forms the rear secondary pressure chamber in fluid communication with the primary pressure chamber.

6. The hydraulic chuck assembly of claim 1, wherein the outer surface of the expansion sleeve comprises a first reduced diameter section, a second reduced diameter section and an intermediate section having a diameter larger than first and section sections.

7. The hydraulic chuck assembly of claim 1, further comprising a pressurized fluid system comprising:
   a pressurized fluid fill port in fluid communication with a pressurized fluid supply inlet; and
   a pressurized fluid line in fluid communication with the pressurized fluid supply inlet and in fluid communication with an inlet of the primary pressure chamber formed between the expansion sleeve and the axial bore.

8. A hydraulic chuck assembly, comprising:
   a tool support member having an axial bore; and
   an expansion sleeve received within the axial bore of the tool support member, the expansion sleeve comprising an inner surface, an outer surface, a front flange extending radially outward from the outer surface and a rear flange extending radially outward from the outer surface;
   a primary pressure chamber formed between the axial bore of the tool support member and the outer surface of the expansion sleeve; and
   at least one of a front secondary pressure chamber and a rear secondary pressure chamber, the front secondary pressure chamber within the front flange in a vicinity of a front braze ring and in fluid communication with the primary pressure chamber, the rear secondary pressure chamber within the rear flange in a vicinity of a rear braze ring and in fluid communication with the primary pressure chamber;
   wherein pressurized fluid within the primary pressure chamber and either the front secondary pressure chamber or the rear secondary pressure chamber puts either the front or rear braze rings in compression.

9. The hydraulic chuck assembly of claim 8, wherein a front undercut is formed in the vicinity of the front braze ring, and wherein a rear undercut is formed in the vicinity of the rear braze ring.

10. The hydraulic chuck assembly of claim 9, wherein the front undercut forms a front secondary pressure chamber in fluid communication with the primary pressure chamber, and wherein the rear undercut forms a rear secondary pressure chamber in fluid communication with the primary pressure chamber.

11. The hydraulic chuck assembly of claim 8, wherein the outer surface of the expansion sleeve comprises a first reduced diameter section, a second reduced diameter section and an intermediate section having a diameter larger than the first and second sections.

12. The hydraulic chuck assembly of claim 8, further comprising a pressurized fluid system comprising:
   a pressurized fluid fill port in fluid communication with a pressurized fluid supply inlet; and
   a pressurized fluid line in fluid communication with the pressurized fluid supply inlet and in fluid communication with an inlet of the primary pressure chamber formed between the expansion sleeve and the axial bore.

\* \* \* \* \*